United States Patent [19]

Swartwood

[11] Patent Number: 5,386,257
[45] Date of Patent: Jan. 31, 1995

[54] APPARATUS FOR ALIGNING THE OPTICAL SYSTEM OF A LAMPHOUSE AND A MOVIE PROJECTOR

[76] Inventor: Troy Swartwood, 779 N. Bensen, Upland, Calif. 91786

[21] Appl. No.: 126,399

[22] Filed: Sep. 27, 1993

[51] Int. Cl.⁶ .............................................. G03B 21/00
[52] U.S. Cl. .................... 352/198; 352/244; 353/122; 356/153; 356/123; 372/102
[58] Field of Search ................... 352/198, 244; 359/18, 359/19; 372/102; 353/122; 356/153, 123

[56] References Cited

U.S. PATENT DOCUMENTS

| | | | |
|---|---|---|---|
| 1,921,215 | 8/1933 | Carpenter | 352/243 |
| 3,043,184 | 7/1962 | Fitzgerald et al. | 356/123 |
| 4,291,990 | 9/1981 | Takasu | 356/445 |
| 4,916,485 | 4/1990 | Loth et al. | 352/198 |
| 5,257,051 | 10/1993 | Bushroe | 353/122 |

*Primary Examiner*—Michael L. Gellner
*Assistant Examiner*—Eddie C. Lee
*Attorney, Agent, or Firm*—Charles C. Logan, II

[57] ABSTRACT

Apparatus for aligning the optical systems of a lamphouse and a movie projector in the form of a laser alignment tool having a single beam laser with a diffraction grating to split the beam into multiple beams and the laser diode module is housed in a cylindrical casing. The diffraction grating splits the single laser into a specific number of beams of equal intensity, consisting of a center beam and each of the beams to either side of it at equal angles. The laser alignment tool has a geared motor with an adjustable speed which rotates the diffraction grating so that each angled beam sweeps a concentric circle with respect to the other beams. The diffraction grating is interchangeable so that the laser alignment tool can be used for lamphouse systems with varying focal lengths or for other applications such as reflector inspection. The motor may be turned on or off while the laser is kept on. The speed of rotation of the beams is controlled by varying the voltage to the motor.

4 Claims, 7 Drawing Sheets

APPARATUS FOR ALIGNING THE OPTICAL SYSTEM OF A LAMPHOUSE AND A MOVIE PROJECTOR

BACKGROUND OF THE INVENTION

The invention relates to a laser alignment tool and more specifically to a device that is used for aligning the optical system of a lamphouse and a movie projector.

In the past the best way to align the optical components of a lamphouse was to put a lamp in the lamphouse, turn it on, and look at the light output on a projection screen and adjust the components until the maximum light output was observed. The optical components that may require adjustment are the mirror and reflector members.

Another problem that exists is that there had not been a system for inspecting the reflectors for flat spots, dents, etc. prior to their being installed in the lamphouse. There has not been any system for allowing the quality control department of a lamphouse manufacturer to check the reflector when they are received from the manufacturer as well as to check the reflector at any time during the manufacture of the lamphouse or during final system testing.

It is an object of the invention to provide a novel laser alignment tool that allows the lamphouse to be aligned with the optical axis, center beam of the projector at the installation site in a theater.

It is also an object of the invention to provide a novel laser alignment tool that can be used for aligning the optical components of the lamphouse for various degrees of freedom tilt.

It is another object of the invention to provide a novel laser alignment tool that can be used for inspecting reflectors to be used in the lamphouse.

It is an additional object of the invention to provide a novel laser alignment tool that is economical to manufacture and market.

It is a further object of the invention to provide a novel laser alignment tool that can be easily installed and removed from a movie projector.

SUMMARY OF THE INVENTION

The laser alignment tool has a single beam laser with a diffraction grating to split the beam into multiple beams and it is housed in a cylindrical housing. The diffraction grating splits the single laser beam into a specific number of beams of equal intensity, consisting of a center beam and each of the beams to either side of it at equal angles. The laser alignment tool has a geared motor with an adjustable speed which rotates the diffraction grating so that each angled beam sweeps a concentric circle with respect to the other beams and to the center. By using the motor, a true, complete circle is obtained. The diffraction grating is interchangeable so that the laser alignment tool may be used for lamphouse systems with varying focal lengths (the distance from the reflector to the crossover point in the lens barrel), or for other applications such as reflector inspection. If only a single beam is required, such as to align the center optical axis, the diffraction grating may be taken out of the tool or only the center beam from the diffraction grating used. The motor may be turned on or off while the laser is on. The speed of the rotation of the beams is controlled by varying the voltage to the motor. The operator may use a screwdriver to turn the trim pot inside the rear end cap of the tool to adjust the speed of rotation. The laser may run off the 9 volt battery inside the housing, or off a 9 volt AC to DC adaptor.

The novel laser alignment tool can perform several functions relating to lamphouse systems. It can be used to verify the center alignment of the projector with respect to the optical system of the lamphouse. The laser alignment tool can also be used for alignment of the optical components such as the mirror and reflector in the lamphouse system. Another use of the laser alignment tool is for inspecting the reflector, to determine how optically true the reflector is with respect to its curvature.

In determining the optical alignment of a lamphouse system having a single mirror in combination with a reflector, the laser alignment tool is put into a projector in place of the lens. If the projector utilizes a lens barrel, an adaptor sleeve is provided with the laser alignment tool. In order to check the center alignment of the optical system only the center beam of the laser alignment tool is important. A center position tool is first placed in the reflector. The center beam of the laser alignment tool should hit the center "bulls-eye" on the center position tool. If the center beam of the laser alignment tool does not hit the center, then the optical axis is non-aligned. Some of the factors affecting this alignment is the projector position relative to the optical axis, the angle of the mirror, and the reflector position relative to the optical axis. By making the necessary adjustments, the center alignment of the optical system can be produced.

In order to check the alignment of the optical components in the lamphouse, the laser is again pointed back toward the lamphouse from the projector, and the laser beams hit the mirror and then the reflector.

The mirror alignment may be checked with respect to its 6 degrees of freedom. A three-beam diffraction grating may be used for this test. The procedure is the same for a grating with more beams. The three laser beams should converge at the reflector's crossover point. The motor is turned on to rotate the laser beams. The beams should remain converged at the same point during a complete rotation of the beams. If the beams do not converge, then either the mirror or the reflector is not properly aligned. Since the optical system is already aligned on the optical axis, the mirror will not need to be tilted by rotating the top or bottom which would change the angle of the optical axis. This angle should remain the same. The mirror should be tilted by rotating the sides around the optical axis. The mirror is then set at the position where the crossover of the three beams is closest to remaining converged through a complete rotation.

Next the reflector alignment may be checked with respect to its 6 degrees of freedom. The three-beam diffraction grating again would be used. This test will be described for a three-beam grating, but the procedure is the same for a grating with more beams. The three laser beams would converge at the reflectors crossover point. The motor is then turned on to rotate the laser beams. The beams should remain converged at the same point during a complete rotation of the beams. If the beams do not converge at the same crossover point inside the reflector, then the reflector is not aligned properly (since the optical system is already aligned on the optical center axis, and the mirror is optimally aligned).

The laser alignment tool can also be used for alignment purposes with a lamphouse that only has a reflector but no mirrors. The previously described steps for adjusting the alignment of the mirror would be omitted and the reflector that would be aligned on the center beam optical axis would be the member to be adjusted. Also the laser alignment tool can be used for alignment purposes with a lamphouse having multiple mirrors.

In the inspection of reflectors, a setup is constructed in which the laser alignment tool and a reflector are set at the proper focal length and are properly aligned to each other a multiple beam grating is used: the more precise the test, the more beams to be used. If the reflector's curvature is optically true, all of the laser beams will remain converged at the reflectors crossover point during a complete rotation of the laser beams. If the reflector is not true, the beams will not converge during a complete rotation. For example, if there is a dimple in the reflector, but the rest of the reflector is optically true, the beams will converge during the rotation except for when they travel across the dimple. It is therefore possible to determine the exact location of the defect in the reflector. The inspection of the reflector would normally be done with a 19-beam diffraction grating utilized in place of the more common three beam diffraction grating. With the motor off, this procedure tests the reflector only on one plane. To vary slightly the position of the beams on the reflector surface, move the laser alignment tool into or out of the lens barrel to move the incident beams along the curvature of the reflector.

DESCRIPTION OF THE PREFERRED EMBODIMENT

The novel apparatus for aligning the optical system of a lamphouse and a movie projector will now be described by referring to FIGS. 1–6 of the drawings. A lamphouse cabinet 10 has a front wall 12 with an opening 14 in it. A projector 16 is supported on a platform 18 held up by a brace 20. Projector 16 has an optical axis center beam identified as x-axis. A laser alignment tool 22 is mounted in the lens opening or a lens barrel sleeve 24 in the projector. A door 24 provides access to a cold mirror 26 that bas conventional structure to give it 6 degrees of freedom of movement. Reflector 28 has a lamp arc position 30. The laser beam trace is identified by numeral 32. Lamphouse cabinet 10 is provided with adjustable height legs 34.

Figure 1:
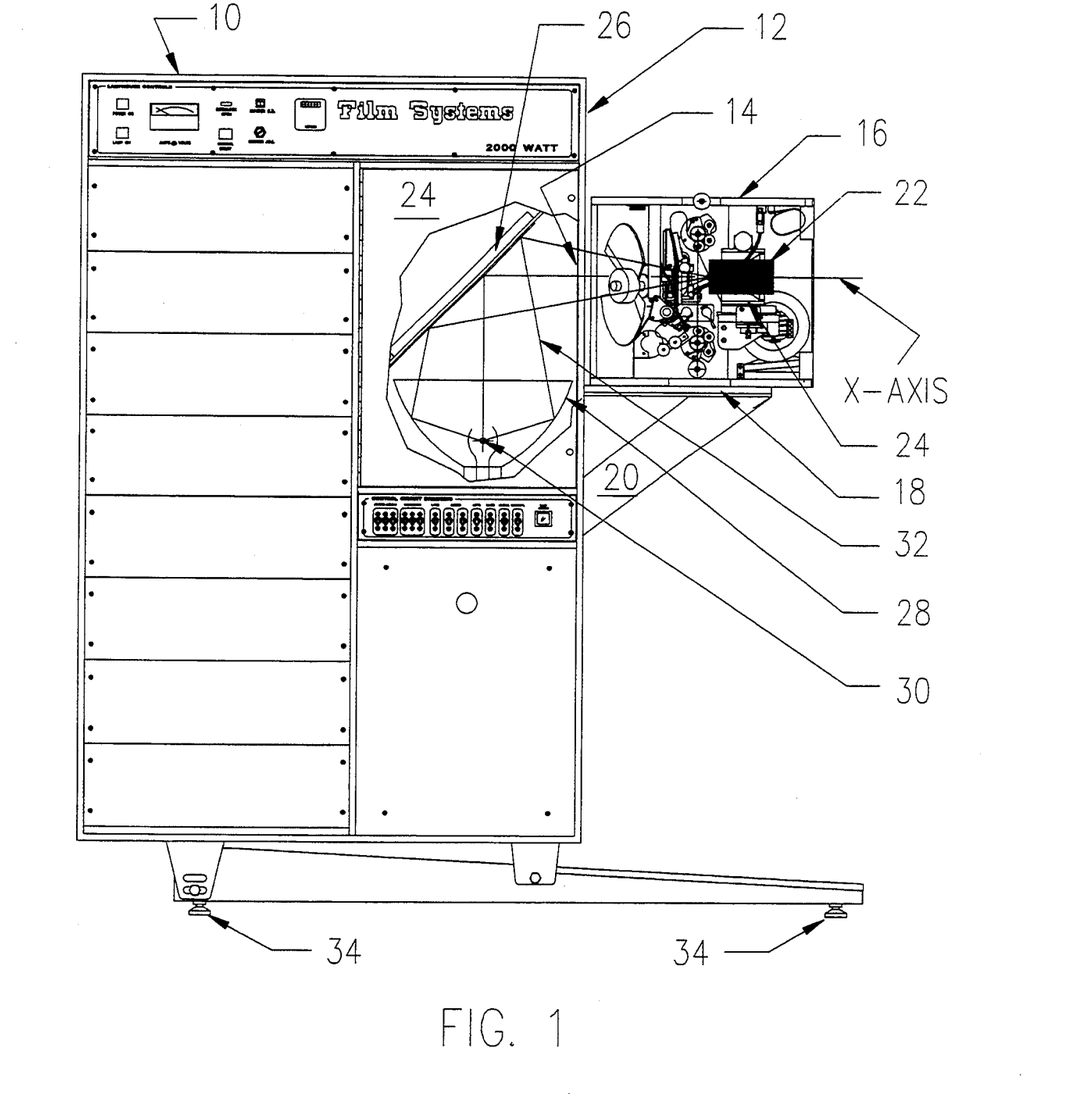
FIG. 1 is a side elevation view of a lamphouse cabinet with a projector mounted on its front wall and having portions of the various structure broken away for clarity.
Figure 2:
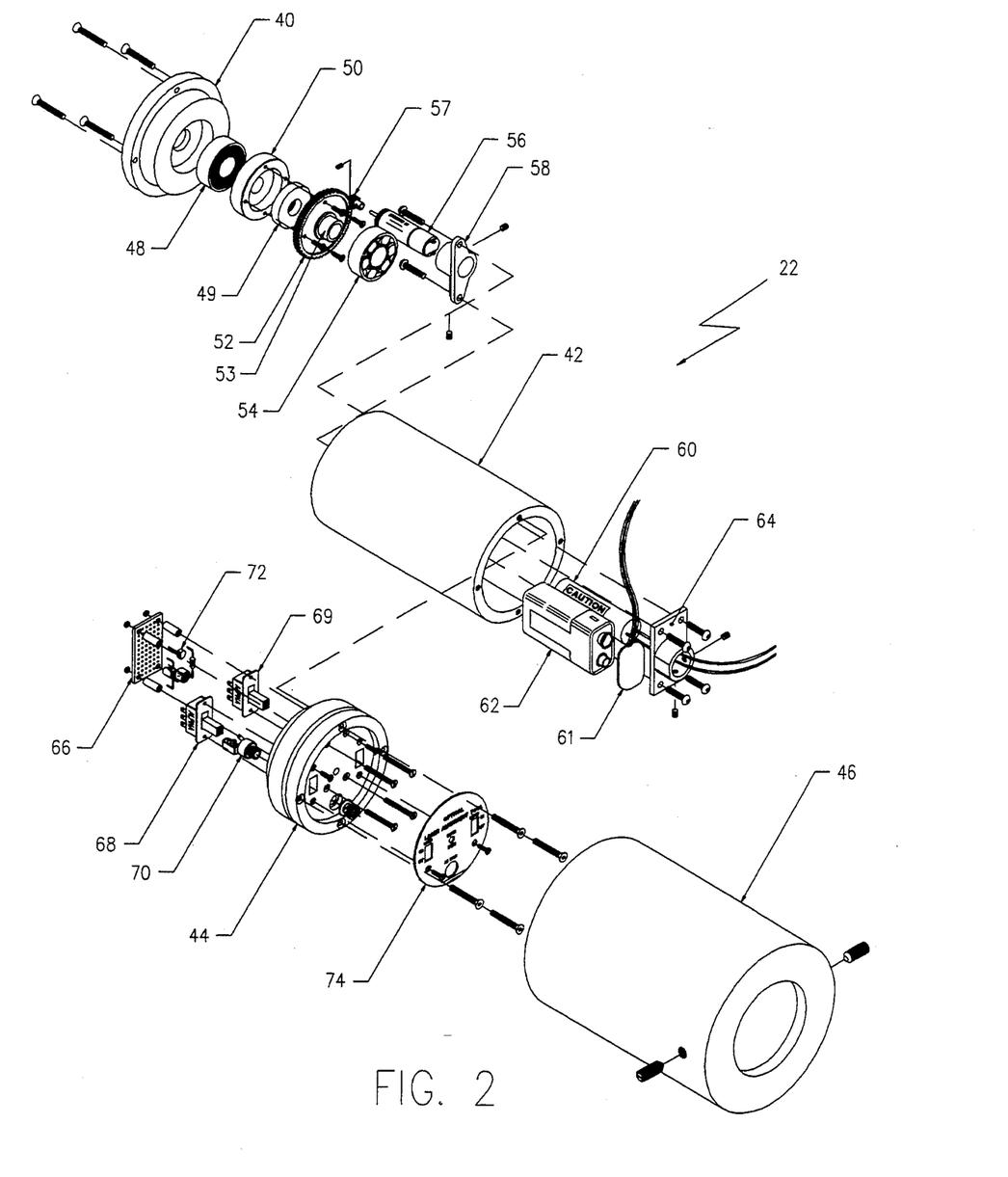
FIG. 2 is an exploded perspective view of the novel laser alignment tool.
Figure 3:
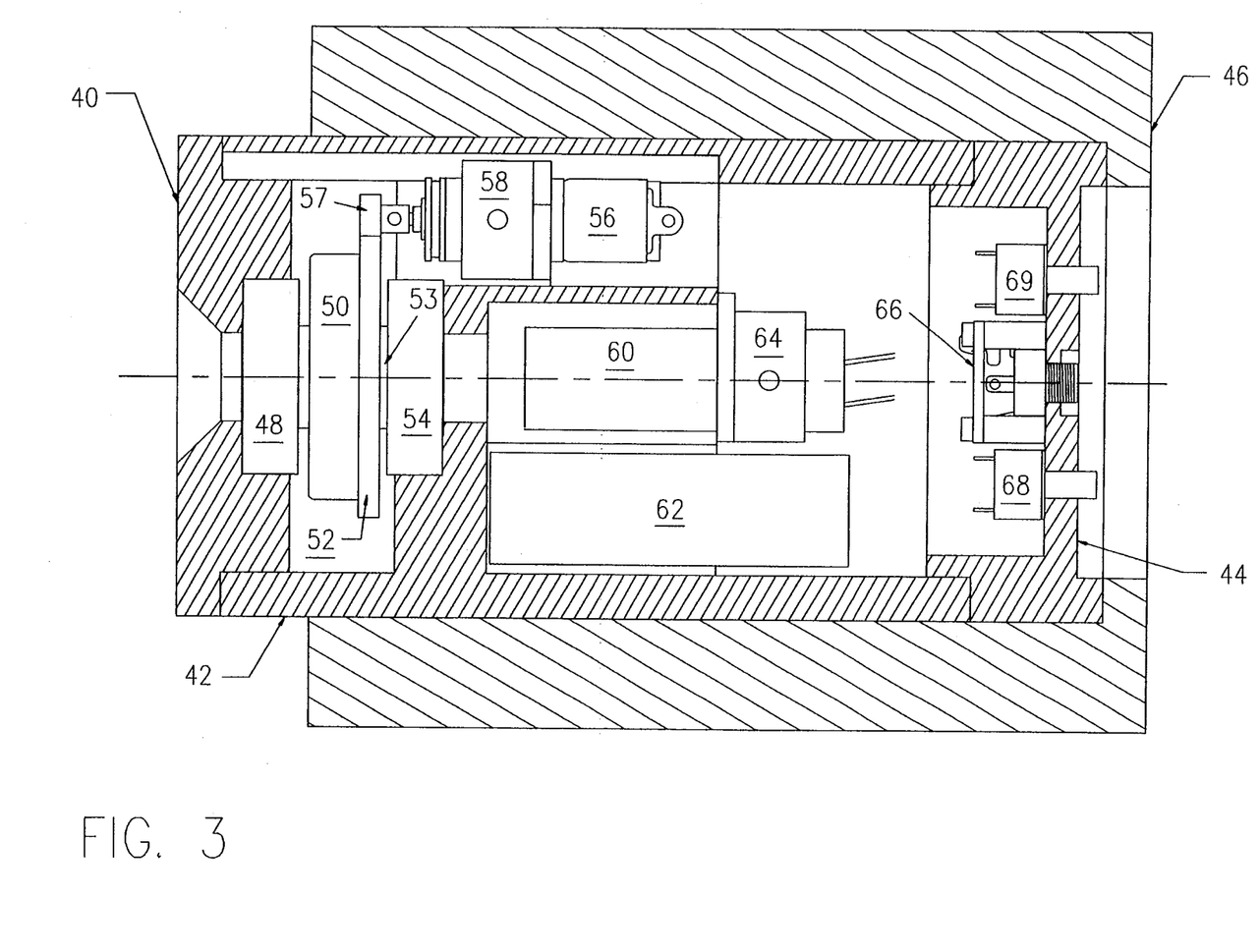
FIG. 3 is a cross sectional view of the novel laser alignment tool.

Laser alignment tool 22 is best illustrated in FIGS. 2 and 3. It has a front end cap 40, a tubular sleeve housing 42 and a rear end cap 44. This entire structure may be mounted in adapter sleeve 46 if the projector utilizes a lens barrel. A ball bearing race 48 is removably received in the rear of front end cap 40. A beam splitter diffraction grating 49 is removably received in grating cover 50 and they are secured in a fixed relationship to center gear 52. Neck 53 of center gear 52 is inserted into ball bearing race 54. A DC motor 56 has a drive gear 57 mounted on its drive shaft that meshes with center gear 52. DC motor 56 is held in position by motor mount 58.

Also within tubular sleeve housing 42 is laser diode module 60 that is connected by battery leads 61 to battery 62. Laser diode module 60 is supported in laser mount 64. The circuit for the laser diode module is mounted on circuit board 66. Also mounted adjacent the rear end of tubular housing sleeve 42 are slide switches 68 and 69, AC input jack 70 and the trim pot of variable voltage regulator 72. A label 74 covers the rear surface of rear end cap 44.

Figure 4A:
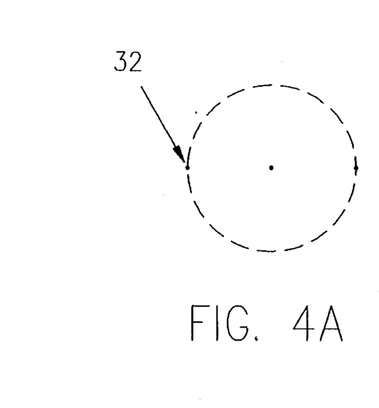
FIGS. 4a and 4b are schematic illustrations showing the use of a 3-beam diffraction grating and the laser beam trace formed therefrom.
Figure 4B:
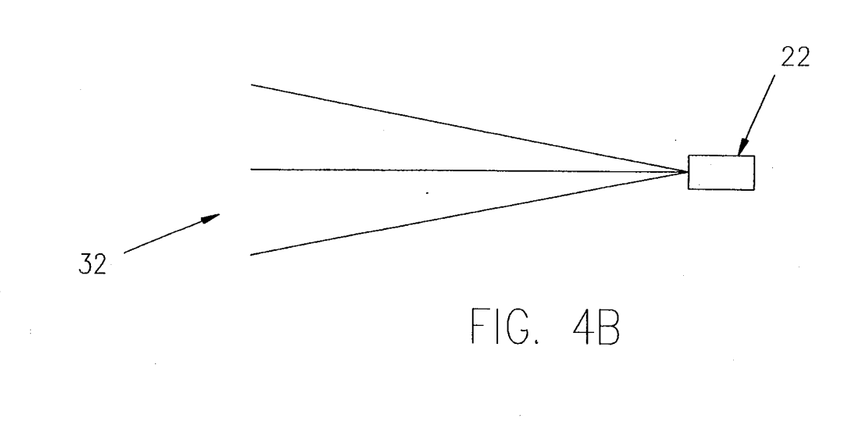
Figure 5A:
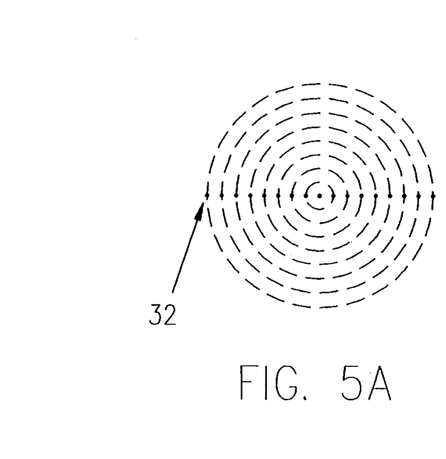
FIGS. 5a and 5b are schematic illustrations showing the use of a 19-beam diffraction grating and the laser beam trace therefrom.
Figure 5B:
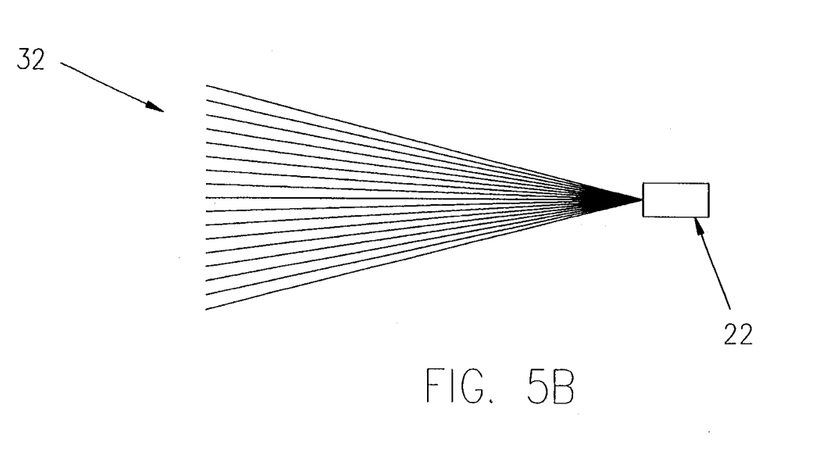
Figure 6:
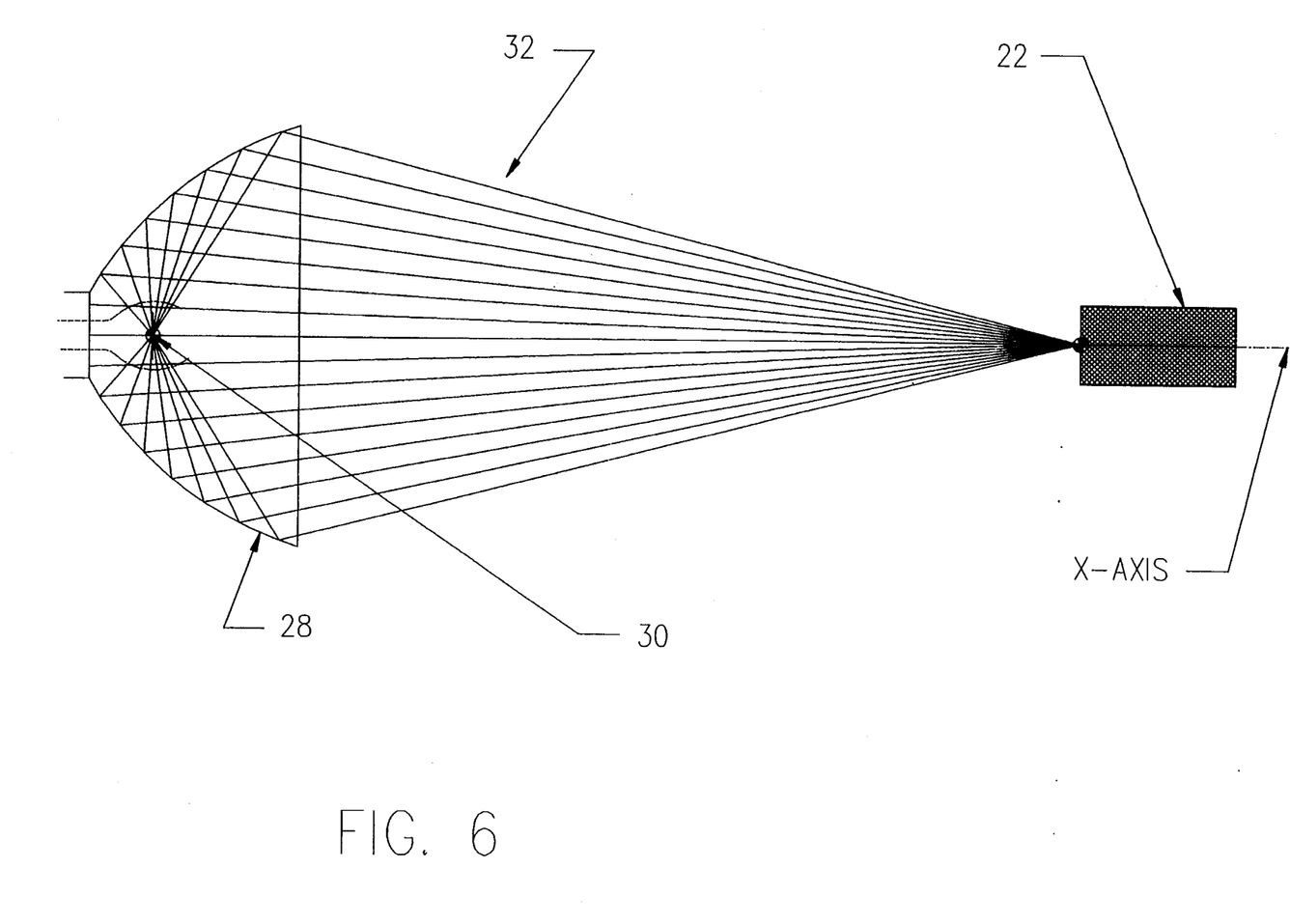
FIG. 6 is a schematic illustration showing the use of a 19-beam diffraction grating for purposes of checking the surface of a reflector.

FIGS. 4a and 4b schematically illustrate the laser beam traces of a 3-beam diffraction grating being used in laser alignment tool 22. FIGS. 5a and 5b schematically illustrate the laser beam traces that would result from a 19-beam diffraction grating. FIG. 6 schematically shows the 19-beam splitter used to check the inner surface of a reflector 28.

Figure 7:
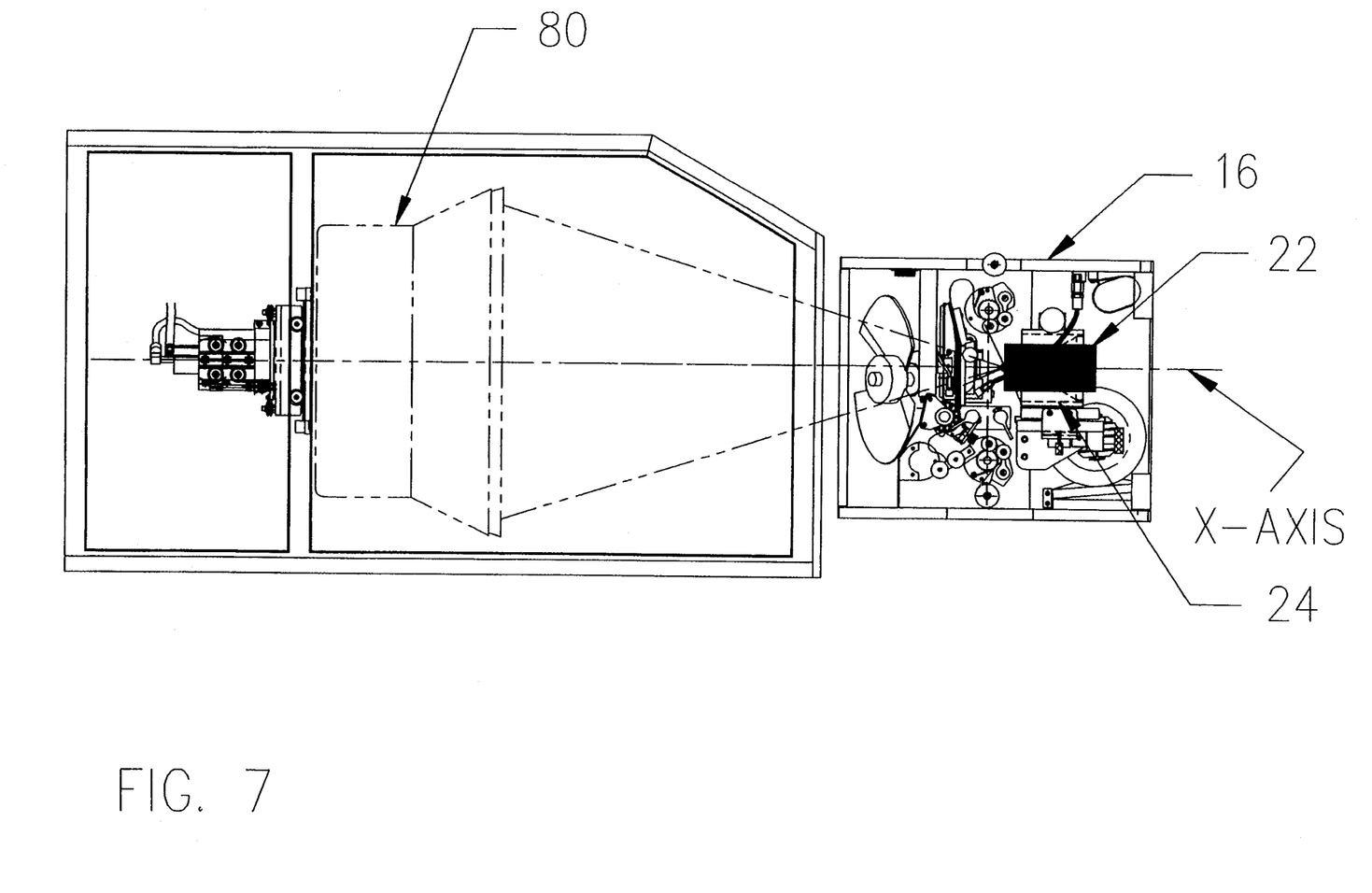
FIG. 7 is a schematic illustration of the optical system of a lamphouse having only a reflector.
Figure 8:
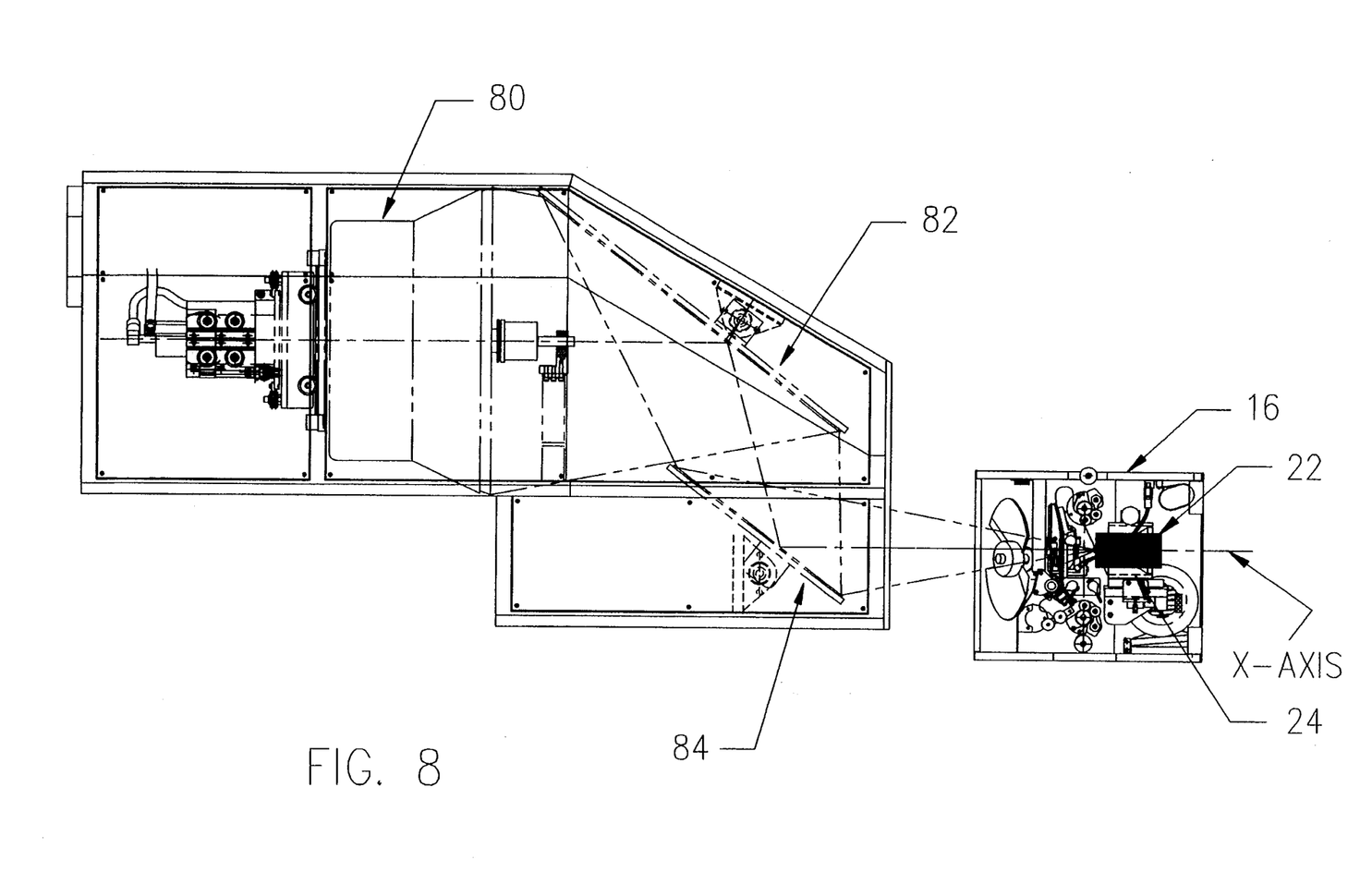
FIG. 8 is a schematic illustration of the optical system of a lamphouse having a reflector and two mirrors.

FIG. 7 illustrates an alternative lamphouse whose optical system only has a reflector 80 in alignment with the center beam optical axis of the projector 16. FIG. 8 illustrates a second alternative lamphouse whose optical system has a reflector 80, a first mirror 82 and second mirror 84 optically aligned with projector 16.

What is claimed is:

1. Apparatus for aligning the optical system of a lamphouse and a movie projector comprising:

a movie projector having a center beam optical axis;

a lamphouse cabinet having a front wall with means for allowing light beams to pass through said front wall;

a mirror having a front surface mounted in said lamphouse cabinet so that said front surface is intersected by said center beam optical axis;

means for adjusting the alignment of said mirror;

a reflector having a front surface mounted in said lamphouse cabinet with its front surface facing the front surface of said mirror;

means for adjusting the alignment of said reflector;

said reflector having a focal point identified as the lamp arc position;

a laser alignment tool comprising; a tubular sleeve housing having a front end and a rear end, a front end cap having a central aperture and a rear end, said front end cap being removably received in the front end of said tubular sleeve; a first ball bearing race removably received in the rear of said front end cap; a beam splitter diffraction grating for splitting the beam into multiple beams of equal intensity consisting of a center beam and beams to either side at equal angles; said beam splitter diffraction grating being removably mounted in a grating cover and they are secured in a fixed relationship to a center gear having a neck that is removably received in a second ball bearing race; a DC motor having a drive gear mounted on a drive shaft and said drive gear meshes with said center gear; means for mounting said DC motor in sad tubular sleeve housing; a laser diode module mounted in said tubular sleeve housing in alignment with the aperture in said front end cap so that a beam of light can pass therethrough; a battery mounted in said laser alignment tool for powering sad laser diode module and said motor; and means for removably mounting said laser alignment tool in said movie projector on said center beam optical axis.

2. Apparatus as recited in claim 1 further comprising means in said laser alignment tool for varying the speed of said DC motor.

3. Apparatus for aligning the optical system of a lamphouse and a movie projector comprising:

a movie projector having a center beam optical axis;

a lamphouse cabinet having a front wall with means for allowing light beams to pass through said front wall;

a reflector having a front surface mounted in said lamphouse cabinet with its front surface facing the front surface of said mirror;

means for adjusting the alignment of said reflector;

said reflector having a focal point identified as the lamp arc position;

a laser alignment tool comprising; a tubular sleeve housing having a front end and a rear end, a front end cap having a central aperture and a rear end, said front end cap being removably received in the front end of said tubular sleeve; a first ball bearing race removably received in the rear of said front end cap; a beam splitter diffraction grating for splitting the beam into multiple beams of equal intensity consisting of a center beam and beams to either side at equal angles; said beam splitter diffraction grating being removably mounted in a grating cover and they are secured in a fixed relationship to a center gear having a neck that is removably received in a second ball bearing race; a DC motor having a drive gear mounted on a drive shaft and said drive gear meshes with said center gear; means for mounting said DC motor in said tubular sleeve housing; a laser diode module mounted in said tubular sleeve housing in alignment with the aperture in said front end cap so that a beam of light can pass therethrough; a battery mounted in said laser alignment tool for powering said laser diode module and said motor; and means for removably mounting said laser alignment tool in said movie projector on said center beam optical axis.

4. Apparatus as recited in claim 3 further comprising means in said laser alignment tool for varying the speed of said DC motor.

* * * * *